Feb. 9, 1965   M. S. CAMPBELL   3,168,858
PANORAMIC CAMERA
Filed July 27, 1962   2 Sheets-Sheet 1

INVENTOR.
MAXWELL S. CAMPBELL
BY
*Stanley Belsky*
ATTORNEY

INVENTOR.
MAXWELL S. CAMPBELL
BY
*Stanley Belsky*
ATTORNEY

United States Patent Office 3,168,858
Patented Feb. 9, 1965

3,168,858
PANORAMIC CAMERA
Maxwell S. Campbell, Elkins, N.H., assignor to Itek Corporation, Lexington, Mass., a corporation of Delaware
Filed July 27, 1962, Ser. No. 212,859
9 Claims. (Cl. 95—16)

The present invention is directed to cameras used in aerial photography, and more particularly to improvements in cameras used for making panoramic photographs. One specific aspect of my invention relates to a novel means for maintaining a film in the proper focal plane relationship relative to the lens elements of a panoramic camera.

Heretofore, one type of camera used in aerial photography has been a "direct scanning" panoramic camera. This type of camera is characterized by an oscillating lens, a movable scanning tube coupling the lens with the film plane, and an arcuate film platen for positioning the film in the proper focal plane position. Photographic quality is directly affected by the accuracy with which the film is located relative to the lens system during the picture taking cycle. Therefore, prior art cameras have used very accurately machined solid platens coupled to a vacuum system for supporting the film surface. Resolution requirements in reconnaissance photography have necessitated the manufacture of film platens to be within very close tolerances, whereby the platen has become costly to manfuacture. Furthermore, the vacuum system needed to hold the film against the platen adds to the complexity of the camera, further increasing its cost. In addition, the vacuum system imposes a possible cause of malfunction thereby effecting overall reliability of the camera system. In prior art cameras, the platen is usually solid, and contributes to the bulk and weight of the camera. In aerial reconnaissance applications it is desirable to minimize weight and size. The solid platen contributes to film wear as the film is transported across the platen. Another problem in prior art cameras in the tendency for various parts of the camera to expand differentially due to thermal changes during operation. This may seriously contribute to loss of resolution due to change in focal length.

In the present invention, the film is accurately positioned in the proper focal plane position by means of two small rollers mounted on the end of the scan arm which oscillates with the lens. The film is maintained in a general arcuate configuration by a pair of oppositely disposed arcuate film guide tracks supporting the edges of the film. The proper positioning of the film relative to the lens elements is determined by the accuracy with which the length of the scan arm is controlled and is not dependent on the accuracy of a multiplicity of components. It is considerably simpler to manufacture the scan tube to an accurate length than to manufacture the curved prior art platen to close tolerances.

The manfuacturing requirements for making the film guide tracks of the present invention are substantially less than those required for making the prior art platen. In the preferred embodiment, the guide tracks are each L shaped channels and are, therefore, considerably lighter and less bulky than the prior art platens. Furthermore, the system needed for holding the film to the curved platen has been eliminated, whereby, bulk, weight, and cost have been further reduced and reliability enhanced.

It is possible with the present invention to substantailly eliminate deterioration of resolution introduced by thermal growth of the camera components which cause the film to move out of proper alignment with the lens assembly. In one embodiment, the material for the scan arms has a coefficient of thermal expansion that will cause the scan arm to expand at rate that will compensate for change in position of the lens elements. In another embodiment the scan arm is made in two telescoping sections which are relatively displaceable with temperature change, whereby the scan arm may be maintained at the proper length for any ambient condition.

It is therefore an object of my invention to provide a novel camera for high resolution aerial reconnaissance photography.

A further object of my invention is to provide a panoramic camera which is characterized by compactness and lightness of weight.

A still further object of my invention is a novel panoramic camera which is simple to manufacture and relatively low in cost.

A still further object of my invention is to provide a novel panoramic camera in which the correct film focal plane position is dependent on the tolerances of a minimum number of components.

In accordance with the present invention, there is provided a panoramic camera for recording information on a web-like film. The camera includes a housing. There are provided film supply means coupled to the housing for storing unexposed film. Film take-up means coupled to the housing, are provided, for storing exposed film. Provided between the supply and take-up means are film support means for supporting film along its edges in an arcuate configuration. There are further provided lens means defining a nodal axis. The lens means is pivotable about the nodal axis for collecting the information and imaging the information in a focal plane. Second support means are coupled to the lens means and pivotable therewith for supporting a portion of the film independent of the first supporting means. The film is supported substantially in the focal plane whereby information is imaged thereon.

For a better understanding of the present invention, together with other and further objects thereof, reference is made to the following description taken in connection with the accompanying drawings and its scope will be pointed out in the appended claims.

Figures 1, 2:
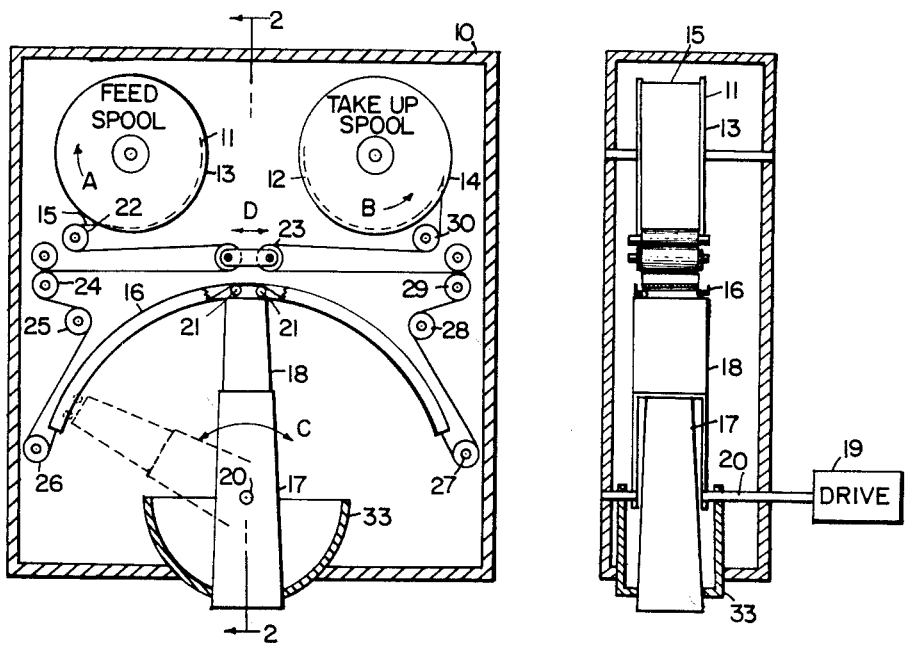
FIGURE 1 is a diagrammatic sectional front view of the camera made in accordance with my invention.
FIGURE 2 is a partial side sectional view taken along the line 2—2 in FIG. 1.

Referring now to the drawings for a more detailed description of my invention and with particular reference to FIGS. 1 and 2, there is here shown a panoramic camera embodying the present invention. The camera includes a light tight camera shell or housing 10 which supports a film supply magazine 11 and a take-up magazine 12. Mounted within the film supply magazine 11 is a feed spool 13 and mounted within the takeup magazine 12 is a take-up spool 14 providing film supply and take-up means, respectively. The feed spools and take-up spools rotate in the direction of arrows A and B, respectively. The film 15 is withdrawn from the feedspool 13 through a system of rollers, which will be described in more detail hereinafter, across a pair of film support rails 16. In the preferred embodiment, the film support rails 16 include a pair of L shaped arcuate rails. The arc of the rails is approximately concentric with the arc generated by the scan tube 18 during its sweep.

The rails 16 support the film 15 along its edges as shown in FIG. 2. Thus, there are provided film support means in the form of rails 16, and a second support means in the form of scan tube 18 and rollers 21. During the actual photographing period, the film 15 is held stationary across the film support rails 16. The film, however, has enough elasticity to permit its elevation off the rail by the rollers 21 as shown in FIG. 1.

The optical system includes a lens housing 17 and a light conduit in the form of a scan tube 18 coupled to the lens housing for movement therewith. The lens housing 17 and scan tube 18 are pivoted and oscillated in the direction of arrows C by a drive 19 coupled to a shaft 20 which is in turn coupled to the lens housing 17 and scan tube 18. The film is maintained in the proper focal plane relationship with the lens element by a pair of rollers 21 mounted on the end of the scan tube 18 adjacent to the film plane. As can be seen in FIG. 1, the film is lifted off the guide rails in the vicinity of the rollers whereby the rollers fix the relationship of the film to the lens element thereby maintaining the correct focal plane position of the film.

Under severe environmental conditions the lens elements may shift due to thermal growth of the lenses and/or housing. If it is desirable to compensate for this effect and maintain the film in proper focal plane position under varying thermal conditions, the material for the scan tube 18 may be so chosen as to have a coefficient of thermal expansion that will compensate for lens shift due to thermal growth. In addition prior to coupling the scan tube 18 to the lens housing 17, it may be desirable to compensate for manufacturing tolerances in the lens assembly by adjusting the height of the scan tube 18 above the lens housing 17.

Coupled to the lens housing is a semi-cylindrical drum 33 which oscillates with the lens and provides a light seal for the housing as the lens oscillates. The center of rotation of the drum 33 is coincident with the center of the shaft 20.

The film feed system includes an idler roller 22 and shuttle assembly 23 which can oscillate in the direction of the arrows D along a pair of guide tracks, not shown. The film is threaded around the idler 25, through the shuttle assembly 23, as shown, through a pair of input metering rollers 24, around the idlers 25 and 26 across the film guide tracks 16 to idler rollers 27 and 28, through a pair of take-up rollers 29, through the shuttle 23, around an idler roller 30 to the take-up reel 14. The input metering rollers 24, feed spool 13 and take-up spool 14 operate continuously. During the picture taking cycle the film is held to the support rails 16 at one end by a clamping means, not shown. It will be apparent that any known means for preventing movement of the film along the rails may be utilized—e.g., braking of rollers. The input metering rollers 24, therefore, cause the shuttle 23 to move to the right from the position shown in FIG. 1. During take-up the framing take-up rollers are actuated causing the shuttle D to move towards the left, withdrawing exposed film from the support rails 16 to the take-up spool 14 while unexposed film is fed to the support rails 16.

Figures 3, 4:
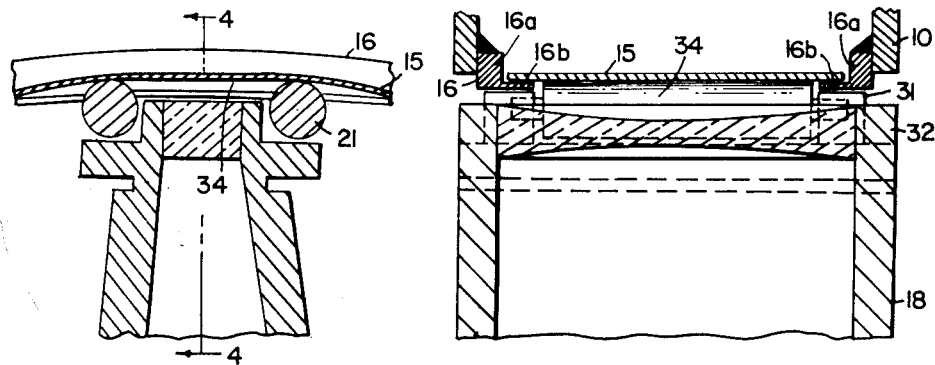
FIGURE 3 is an enlarged partially sectional view of the scan tube and film support rollers.
FIGURE 4 is an enlarged front elevational view partially in section, taken along line 4—4 in FIG. 3, showing the film support rollers and guide tracks.

Referring now to FIGS. 3 and 4, there is here shown an enlarged partially sectional view of the scan tube and film support rollers, and an enlarged front sectional view of the scan tube showing the film support rollers and support rails respectively. In the preferred embodiment, the film support rails 16 have an L-shaped cross-section. The upstanding legs of the rails are connected to the housing 10, for example, by welding.

As can be seen more clearly in FIG. 4, the rails 16 are oppositely disposed with sufficient clearance between the inner faces of their upstanding legs 16a to allow the film to pass freely between the legs. The horizontal legs 16b of the rails are so disposed as to support the film adjacent its edges. The spacing between the opposed edges of the horizontal legs 16b is selected to allow the rollers 21 to pass freely between the rails lifting the film off the horizontal legs 16b in the vicinity of the rollers.

Coupled to the scan tube 18 and forming a part thereof is an end-cap 32. The end-cap 32 has an exposure slit 34 therein. The slit is generally rectangular in shape and in a plane parallel to the plane of the film 15. A shutter, not shown, may be coupled to the slit 34 for varying the size of its opening. Mounted on top of the end-cap 32 are four pillow blocks 31, two of which are shown in FIG. 4, to support the rollers 21. As the scan tube 18 oscillates the rollers 21 traverse the film. The rollers are preferably made of a material, such as rubber, to minimize possible degradation of the film. As can be seen more clearly in FIG. 3, the film is lifted off the rails 16 by the rollers 21 and approaches a flat surface between the rollers. Since the image is recorded on the film between the rollers, the image area at any time during photography approaches a flat surface while the reminder of the film conforms to the arcuate configuration of the rails 16. Furthermore, the focal plane relationship between that part of the film upon which an image is being recorded at any instant of time is established by the distance between the top of the rollers 21 and the lens elements. Relative to manufacturing a curved platen to close tolerances for establishing an accurate focal plane relationship for the film, it will be apparent that the camera embodying my invention is less costly to manufacture.

Referring now to FIGS. 1 and 2, the operation will be described assuming the film has been loaded as shown in FIG. 1. While the film is in position for actual photographing, it is clamped to the rail 16 by suitable clamping means, not shown. The feed spool 13 rotates in the direction of arrow A causing film 15 to travel around the idler puller 22, through shuttle 23 through metering rollers 24 around the idlers 25 and 26 to the rail 16. Since film is being fed from the feed spool A at the same time it is clamped to the guide rails 16, the shuttle D moves towards the right to accommodate the increasing length of film available to the rails. Simultaneously, the scan arm 18, lens housing 17 and rollers 21 are pivoted about shaft 20 from the dotted position shown at the left of FIG. 1. The assembly is driven by the motor 19 through the shaft 21 causing pivotal motion about the shaft 20. Light entering the lens housing through the lens elements (not shown) mounted in the lens housing 17 pass through the light conduit or scan tube 18 between the rollers 31 (see FIG. 3) to the film 15.

Referring now to FIGS. 3 and 4, the film 15 is lifted from the rails 16 by the rollers 21 which are disposed between the rails. The focal plane position of the film 15 in the area where light is being imaged through the exposure slit 34 is established by the rollers 21 and scan tube 18. The rollers and scan tube establish the focal plane progressively as they sweep the film. The film that is not actually being photographed is supported by the guide rail 16 in an arcuate position. Film immediately adjacent the rollers, not actually being photographed, is raised slightly off the rail as shown in FIG. 3. Although not shown, the exposure slit 34 may have a shutter therein for varying the opening, or completely closing the slit. When the scan tube 18 and lens housing 17 complete their sweep at the right hand side of FIG. 1, the film 15 is then unclamped from the rails and the take-up drive withdraws the exposed film. The film is withdrawn from the rails around the idlers 27 and 28, through the take-up rollers 29, which operate only during film withdrawal, around the shuttle 23, idler 30 to the take-up spool 14. The shuttle 23 returns to the right as unexposed film is simultaneously fed to the guide rails 16 around the idler 26. Simultaneously, the scan arm returns to the dotted position shown at the left hand portion of FIG. 1 to prepare for the next cycle of photography. During the return cycle a shutter in the scan tube is closed. The shutter has not been shown in FIGS. 1-4, but is illustrated schematically in FIG. 5. Alternately, it may be desirable to start exposing the next strip of film starting from the right hand side going towards the left to minimize lost motion between photography.

While the guide rails 16 have been shown as L-shaped, it will be apparent that other shapes may be equally well suited. For example, the guide rails may be a U-shaped channel or in the alternative may be a pair of horizontal flanges projecting outward from the housing. The film should be supported adjacent its edges and there should be sufficient clearance between the film supports to allow the rollers to pass freely. The accuracy in manufacture of the rails is not particulalry critical, since the focal plane position of the film is established by the rollers, scan tube and lens housing.

Figure 5:
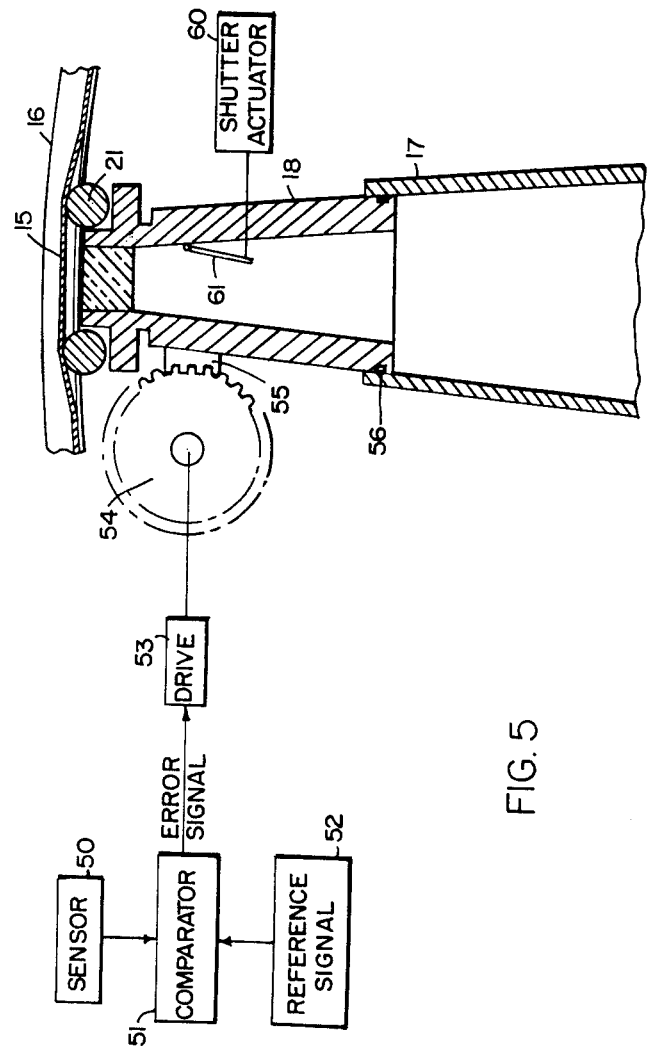
FIGURE 5 is a schematic illustration of another embodiment of the present invention.

Referring now to FIG. 5, there is here schematically illustrated another embodiment of the present invention. Since the device, as shown in FIG. 5, is generally similar to that of FIGS. 1-4 inclusive, corresponding elements are indicated by identical reference numerals. The device shown in this embodiment provides means for translating the scan tube 18 in order to vary the focal plane position of the film 15.

It may be desirable under extreme environmental conditions to vary the position of the film relative to the lens elements as the lens elements vary with temperature. This type of provision allows the film to be maintained in the proper focal plane position under varying environmental conditions. The device, as shown, includes a sensor 50 for sensing the desirable environmental condition. For example, the sensor may be a thermocouple or strain gauge mounted on the lens housing for measuring change of position of the lens elements as a function of temperature. The sensor provides a signal representative of the change in environmental conditions to a comparator 51. A reference signal 52 is also transmitted to the comparator 51. An error signal is generated by the comparator which may be the algebraic difference of the reference and sensor signals. The error signal is transmitted to a drive 53 which in turn is coupled to a pinion 54. The pinion 54 rotates in response to the error signal driving a rack 55 which is mounted on the scan tube 18. The scan tube in this embodiment is slidable in the lens housing 17. A light seal, for example an O ring 56, is provided between the scan tube 18 and the lens housing 17 in order to avoid light leakage. The scan tube 18 is capable of translating vertically, to vary the amount of elevation of the film 15 off the guide rail 16 by the rollers 21. The film, therefore, may be maintained in the proper focal plane position as environmental conditions change. It will be apparent that the amount of vertical travel of the scan tube 18 will be controlled between the predetermined limits in order to prevent interference of the scan tube with the guide rails 16 and/or separation of the scan tube 18 from the lens housing 17.

Hinged to the scan tube 18 is a shutter 61, coupled to an actuator 60. During the picture taking cycle, the shutter 61 is held in the open position. During the return cycle of the scan arm, the shutter actuator 60 causes the shutter to close the scan tube preventing exposure of the previously exposed and new film being transported through the guide rails. It will be apparent, that this shutter arrangement can be used in the embodiment illustrated in FIGS. 1-4. Although this embodiment has been described in terms of sensing thermal conditions, it may also be used to correct for structural deformation of the lens housing, or to compensate for tolerance build up in the lens elements during manufacture without departing from the present invention.

While there has been described what is at present considered to be the preferred embodiment of this invention, it will be obvious to those skilled in the art that various changes and modifications may be made therein without departing from the invention, and it is, therefore, aimed in the appended claims to cover all such changes and modifications as fall within the true spirit and scope of the invention.

What is claimed:

1. A panoramic camera for recording information on a web-like film, comprising:
   a stationary housing;
   film supply means coupled to said housing for storing unexposed film;
   film take-up means coupled to said housing for storing exposed film;
   film support means for supporting film along its edges in an arcuate configuration between said supply and take-up means;
   lens means defining a nodal axis, said lens means being pivotable about said nodal axis for collecting information and imaging said information in a focal plane and;
   second support means coupled to said lens means and pivotable therewith for supporting a portion of said film independent of said first supporting means, said film portion being supported substantially in said focal plane whereby said information is imaged on said portion.

2. A panoramic camera for recording information on a web-like film, comprising:
   a stationary housing;
   film supply means coupled to said housing for storing unexposed film;
   film take-up means coupled to said housing for storing exposed film;
   film support means including a pair of elongated arcuate rails for supporting film along its edges in an arcuate configuration between said supply and take-up means;
   lens means defining a nodal axis, said lens means being pivotable about said nodal axis for collecting information and imaging said information in a focal plane and;
   second support means coupled to said lens means and pivotable therewith for supporting a portion of said film independent of said first supporting means, said film portion being supported substantially in said focal plane whereby said information is imaged thereon.

3. A panoramic camera for recording information on a web-like film, comprising:
   a stationary housing;
   film supply means coupled to said housing for storing unexposed film;
   film support means including a pair of oppositely disposed elongated, arcuate rails, each of said rails having flanges extending therefrom toward said opposite rail, each of said flanges supporting said film along one of its edges in an arcuate configuration between said supply and take-up mean;
   lens means defining a nodal axis, said lens means being pivotable about said nodal axis for collecting information and imaging said information in a focal plane and;
   second support means coupled to said lens means and pivotable therewith for supporting a portion of said film independent of said first supporting means, said film portion being supported substantially in said focal plane whereby said information is imaged thereon.

4. The combination of claim 3 wherein said rails have an L-shaped cross-section.

5. A panoramic camera for recording information on a web-like film, comprising:
   a stationary housing;
   film supply means coupled to said housing for storing unexposed film;

film take-up means coupled to said housing for storing exposed film;

film support means for supporting film along its edges in an arcuate configuration between said supply take-up means;

lens means defining a nodal axis, said lens means being pivotable about said nodal axis for collecting information and imaging said information in a focal plane; and a light conduit coupled to said lens means cooperating therewith to image said information in said focal plane, said conduit having second support means coupled thereto for supporting a portion of said film independent of said first support means substantially in said focal plane, said conduit and second support means being pivotable with said lens means, whereby said information is imaged on said film portion.

6. A panoramic camera for recording information on a web-like film comprising:

a stationary housing;

film supply means coupled to said housing for storing unexposed film;

film take-up means coupled to said housing for storing exposed film;

film support means for supporting film along its edges in an arcuate configuration between said supply and take-up means;

lens means defining a nodal axis, said lens means being pivotable about said nodal axis for collecting information and imaging said information in a focal plane;

an elongated light conduit having one end coupled to said lens means for movement therewith, and having an exposure slit defining opening in its opposite end; and a pair of rollers coupled to said conduit adjacent said exposure slit for supporting a portion of said film independent of said first supporting means, said film portion being supported substantially in said focal plane whereby said information is imaged thereon.

7. A panoramic camera for recording information on a web-like film, comprising:

a stationary housing;

film supply means coupled to said housing for storing unexposed film;

film take-up means coupled to said housing for storing exposed film;

film support means including a pair of elongated arcuate rails for supporting film along its edges in an arcuate configuration between said supply and take-up means;

lens means defining a nodal axis, said lens means being pivotable about said nodal axis for collection information and imaging said information in a focal plane and;

second support means disposed between said rails and coupled to said lens means for movement therewith for supporting a portion of said film independent of said rails, said film portion being supported substantially in said focal plane whereby said information is imaged thereon.

8. A panoramic camera for recording information on a web-like film, comprising:

a stationary housing;

film supply means coupled to said housing for storing unexposed film;

film take-up means coupled to said housing for storing exposed film;

film support means including a pair of oppositely disposed elongated, arcuate rails, each of said rails having flanges extending therefrom toward said opposite rail, each of said flanges supporting said film along one of its edges in an arcuate configuration between said supply and take-up means;

lens means defining a nodal axis, said lens means being pivotable about said nodal axis for collecting information and imaging said information in a focal plane and;

second support means disposed between said flanges and coupled to said lens means for movement therewith for supporting a portion of said film independent of said flanges, said film portion being supported substantially in said focal plane whereby said information is imaged thereon.

9. A panoramic camera for recording information on a web-like film, comprising:

a stationary housing;

film supply means coupled to said housing for storing unexposed film;

film take-up means coupled to said housing for storing exposed film;

film support means including a pair of oppositely disposed elongated, arcuate rails, each of said rails having flanges extending therefrom toward said opposite rail, each of said flanges supporting said film along one of its edges in an arcuate configuration between said supply and take-up means;

lens means defining a nodal axis, said lens means being pivotable about said nodal axis for collecting information and imaging said information in a focal plane;

an elongated light conduit having one end coupled to said lens means for movement therewith, and having an exposure slit defining opening in its opposite end; and a pair of rollers disposed between said flanges and coupled to said conduit adjacent said exposure slit for supporting a portion of said film independent of said first supporting means, said film portion being supported substantially in said focal plane whereby said information is imaged thereon.

References Cited in the file of this patent

UNITED STATES PATENTS

| 369,165 | Connon | Aug. 30, 1887 |
| 1,257,656 | Warman | Feb. 26, 1918 |

FOREIGN PATENTS

| 355,960 | Germany | July 8, 1922 |